Patented Sept. 12, 1933

1,926,626

UNITED STATES PATENT OFFICE 1,926,626

METHOD OF MAKING FLUFFY, HYDRATED CALCIUM SULPHATE

Walter Hoge MacIntire, Knoxville, and Thomas Barnes Stansel, Mascot, Tenn., assignors to American Zinc, Lead & Smelting Company, St. Louis, Mo., a corporation of Maine No Drawing. Application February 6, 1932
Serial No. 591,446

18 Claims. (Cl. 23—122)

This invention relates to a process of obtaining a finely divided fluffy type of hydrated calcium sulphate and the product of such process, which product is a special type of pulverulent, crystalline calcium sulphate and is peculiarly useful for the purpose of insulation, though it may be advantageously used for other purposes. Prior to the present invention, it has been customary to add sulphuric acid to finely divided dolomite or other limestone formations primarily to obtain magnesium sulphate and carbon dioxide along with a dense type of calcium sulphate that is usually discarded as waste product. According to the present invention, however, instead of adding sulphuric acid to the dolomite, we reverse the procedure, i. e., we add the dolomite in a finely divided condition to a hot sulphuric-acid-water solution of known concentration and controlled temperature, the finely divided dolomite being added in fractions of the total amount added, and after the dolomite has been added we add successive amounts of water and maintain the temperature control and dispersal of the solid in the gas-impregnated mixture, with the resultant production of hydrated calcium sulphate of exceeding fineness, minimum density and of a fibrous, crystalline structure. This characteristic structure facilitates and expedites the filtration of the magnesium sulphate solution.

In carrying out the process, a definite quantity of sulphuric acid is diluted to a prescribed volume, and an amount of finely divided dolomite (slightly less than chemical equivalence of the sulphuric acid) is then introduced by progressive additions of fractions of the total charge. Preferably the containers are insulated to the end that the desired minimum temperature of reaction heat of approximately 70° C. may be maintained. After the complete charge of dolomite has been introduced, successive additions of water, with gentle agitation, are used, the amount of water added being sufficient to maintain a uniform pasty mass until the reactions of hydration and complete chemical evolution of carbon dioxide have ensued. The additions of water are discontinued when observations between agitations show that the mass is contracting slightly—sufficiently to show a definite layer of clear supernatant liquid. A period of approximately forty-five minutes after the last dolomite addition is required to effect this result. The container may be open, or it may be closed to permit the by-product recovery of carbon dioxide. The finely divided hydrated calcium sulphate is then filtered from the solution and washed free of magnesium sulphate and permitted to dry spontaneously with good ventilation and conducive temperature, or it may be dried in any of the conventional drying devices at a temperature below 80° C. The dried material thus obtained is not only superior to the mass of finely divided ground mineral as an insulating material, but it may also be transformed into plaster of Paris by the commonly practiced method of heating in "kettles" at the temperature and for the period required to drive off approximately three-fourths of its crystalline water.

While for the purpose of describing the invention we shall refer specifically to a dolomite limestone of approximately 52% $CaCO_3$ and 37½% $MgCO_3$ content, it is to be expressly understood that the invention is not limited to this specific form of limestone, and the amount of $H_2SO_4$ used will be governed by the chemically-determined neutralizing value of the limestone, the amount of $H_2SO_4$ used being preferably a slight excess over the theoretical requirements for the complete disintegration of the particular limestone employed. The amount of $H_2SO_4$ will vary, of course, with the purity and Ca+Mg ratio-content of the rocks. The specific form of dolomite or other limestone referred to in the example of the method pursued, hereinafter referred to, carries about 10% quartz (sand). Notwithstanding the presence of this component, the new-type of hydrated calcium sulphate produced by the process of the present invention is very much lighter than the most finely ground natural gypsum.

As a specific example of the practice of the process of this invention we take 55 cc. of 1.84 specific gravity $H_2SO_4$ and add this to 165 cc. of water and thoroughly mix the same. To this we then add 100 grams of finely ground (minus-100-mesh) "Mascot" dolomite in progressive fractions of from one-sixth to one-tenth of the total dolomite added, and intermittently gently stir the mass. Preferably a period of approximately ten minutes ensues between the first and the final fractions of the dolomite. It will be understood that slight variations in the magnitude of the fractions of the added dolomite are not material.

After the final fraction of the dolomite has been added, water is added in ten consecutive portions of 10 cc. each, these additions extending over a period of approximately forty-five minutes. The mixture is gently stirred after each addition of water. After a period of from fifteen to forty-five minutes, subsequent to the addition of the last 10 cc. of water, the magnesium sulphate solution is filtered and the calcium sulphate residue is washed.

The product is readily filtered out by suction, and the filtered and washed product is then dried at a temperature below 80° C., and preferably screened through a 20 mesh sieve to disintegrate any lumps. The resultant product is a voluminous, fluffy, pulverulent, crystalline, hydrated calcium-sulphate, plus, of course, any insoluble material native to the dolomite or other limestone employed. It will be understood, of course, that the containers employed are made of or lined with any suitable acid resistant material that will stand up against both chemical reaction and abrasion. If the reactions involved be brought about in a closed system, the evolved $CO_2$ may be conserved, otherwise the process may be carried out in open vessels.

It will be noted that the process of the present invention is a complete inversion of the usual process in which sulphuric acid is added to a mass of dolomite, i. e., the present invention involves the progressive fractional additions of the dolomite to the diluted acid, instead of pouring the acid upon the dolomite. Furthermore, the maintenance of moisture relationships, as influenced by the progressive additions of water, is also an important factor.

While it is preferred to maintain the minimum temperature of approximately 70° C., which is obtained in the reaction chamber during the dolomite-$H_2SO_4$-$H_2O$ reaction by the immediate use of the hot $H_2SO_4$-$H_2O$, nevertheless a finely divided product may be obtained even if the heat of dilution and that of reaction is not utilized, but a more fluffy product is obtained by the utilization of the heat of dilution and that of reaction. Furthermore, a still more fluffy type of hydrated $CaSO_4$ is obtained when external heat is used. In general, high temperature gives a fluffier material, whereas lower temperatures give a material less fluffy in nature, and it has been found that the more fluffy the material, the better it is adapted for use as an insulating material.

The product obtained by adding the dolomite to the $H_2SO_4$-$H_2O$ mixture under different temperature conditions will vary, for the respective volume, weights approximately as follows:

1. The product obtained by the addition of external heat to the diluted acid and to the reaction chamber during the progressive addition of dolomite has a volume weight of approximately 9.3 pounds per cubic foot, loose powder, unpacked.

2. The product obtained by the full usage of the heat generated by $H_2SO_4$+water solution and dolomite-$H_2SO_4$-$H_2O$ reaction has a volume weight of approximately 12.8 pounds per cubic foot, loose powder, unpacked.

3. The product obtained when the heat of the $H_2SO_4$+water reaction is dissipated and no external heat is employed has a volume weight of approximately 14.6 pounds per cubic foot, loose powder, unpacked. Even this last mentioned product is decidedly more fluffy than either the pulverized natural gypsum or the crystalline product that is obtained by the addition of acid to the solid carbonate. This will be appreciated when it is stated that the addition of concentrated $H_2SO_4$ to a "Mascot" dolomite suspension in water gave a hydrated calcium sulphate weight of 29.6 pounds per cubic foot, while a commercial grade of plaster of Paris weighed 49.5 pounds per cubic foot.

To recapitulate: By the use of the fundamental principle of adding dolomite to the sulphuric acid solution in fractional quantities there is obtained a very finely divided product, even if the heat of dilution and that of reaction is not utilized; but a still more fluffy product is obtained by the use of the heat of dilution and that of reaction; while a still further fluffy type of the hydrated $CaSO_4$ is obtained when external heat is used.

While for the purpose of clearly describing the invention, specific proportions, temperatures and other features have been given, it will be readily understood by those skilled in the art that these may be departed from within limits, without departing from the inventive idea. Furthermore while we have specifically described the invention in connection with the use of "Mascot" dolomite, other forms of limestone may be similarly treated, as well as natural carbonates, the amount employed in any case, however, being slightly less than the chemical equivalence of the sulphuric acid.

All of such variations, as well as such others as will readily suggest themselves to those skilled in the art, as fall within the terms of the appended claims are intended to be covered thereby.

Having thus described the invention, what is claimed is:

1. A process comprising the step of adding dry dolomite to a hot sulphuric-acid-water mixture.

2. A process comprising the step of adding finely divided dry dolomite to a hot sulphuric-acid-water mixture.

3. A process comprising the step of adding a fixed amount of dry dolomite to a hot-sulphuric-acid-water solution, the dolomite being added in successive fractions.

4. A process comprising the step of adding to a hot sulphuric-acid-water solution an amount of dry dolomite slightly less than the chemical equivalent of the sulphuric acid in said solution.

5. A process comprising the step of adding to a hot sulphuric-acid-water solution an amount of dry dolomite slightly less than the chemical equivalent of the sulphuric acid in said solution, the dolomite being added in successive fractions of said amount.

6. A process comprising the step of adding to a hot sulphuric-acid-water solution a mass of finely divided dry dolomite, said mass being slightly less than the chemical equivalent of the sulphuric acid in said solution and being added in successive fractions of said mass.

7. A process comprising the step of adding in successive fractions a dry dolomite to a hot sulphuric-acid-water solution and maintaining the temperature of reaction heat approximately constant.

8. A process comprising the step of adding in successive fractions a dry dolomite to a hot sulphuric-acid-water solution and maintaining the temperature of reaction heat at approximately 70° C.

9. A process comprising the step of adding in successive fractions a dry dolomite to a hot sulphuric-acid-water solution while raising the temperature of the solution above that of the reaction heat.

10. A process comprising the step of forming a sulphuric-acid-water solution, permitting the heat of reaction of said solution to fall to room temperature, and then adding in successive fractions a dry dolomite to the solution.

11. A process comprising the step of adding dry dolomite to a hot sulphuric-acid-water solution and then repeatedly adding a quantity of water to the solution.

12. A process comprising the step of adding dry dolomite to a hot sulphuric-acid-water solution and then repeatedly adding a quantity of water to the solution with gentle agitation after each addition of water.

13. A process comprising the step of adding dry dolomite to a hot sulphuric-acid-water solution and then repeatedly adding a quantity of water to the solution until the mass begins to contract.

14. A process comprising the steps of adding a dry dolomite to a hot sulphuric-acid-water solution, then adding water to the solution, then filtering out the resultant hydrated calcium sulphate and washing, and drying the same.

15. A process comprising the steps of adding a mass of dry dolomite to a hot sulphuric-acid-water solution, the said mass being added in successive fractions thereof, then adding water to the solution, and then filtering out the resultant hydrated calcium sulphate.

16. A process comprising the steps of adding a mass of dry dolomite to a hot sulphuric-acid-water solution, the said mass being added in successive fractions thereof, then adding water to the solution, then filtering out the resultant hydrated calcium sulphate and then washing and drying the same.

17. A process comprising the step of adding a mass of dry dolomite to a hot sulphuric-acid-water solution, the said mass being added in successive fractions thereof, then repeatedly adding water to the solution, and then filtering out the resultant hydrated calcium sulphate.

18. The process of obtaining hydrated calcium sulphate which consists in adding dry dolomite to a hot sulphuric-acid-water solution and gently agitating to insure complete hydration, and then adding water with gentle agitation until the mass contracts sufficiently to show a layer of clear supernatant liquid, and then filtering out the hydrated calcium sulphate.

WALTER HOGE MacINTIRE.
THOMAS BARNES STANSEL.